United States Patent [19]

Mozer

[11] 4,002,709
[45] Jan. 11, 1977

[54] CONTROLLED AIR IN POLYESTER TUBE EXTRUSION FOR CLEAR SEALABLE PARISON

[75] Inventor: Larry P. Mozer, Bartlesville, Okla.

[73] Assignee: Phillips Petroleum Company, Bartlesville, Okla.

[22] Filed: Sept. 25, 1975

[21] Appl. No.: 616,533

[52] U.S. Cl. .................................. 264/90; 264/99; 264/150; 264/209

[51] Int. Cl.² .................. B29C 17/07; B29D 23/04

[58] Field of Search ............... 264/89, 90, 92–99, 264/209, 150, 82, 85; 425/72, 326 R, 326 B, 387 B, 388, 392, DIG. 206, DIG. 212; 260/75 T

[56] References Cited

UNITED STATES PATENTS

| 2,814,071 | 11/1957 | Allan et al. | 264/95 X |
|---|---|---|---|
| 3,169,272 | 2/1965 | Maxson | 264/209 X |
| 3,231,642 | 1/1966 | Goldman et al. | 264/95 |
| 3,248,463 | 4/1966 | Wiley et al. | 264/95 |
| 3,296,661 | 1/1967 | De Moustier | 264/89 X |
| 3,496,143 | 2/1970 | Siggel et al. | 264/92 X |
| 3,522,337 | 7/1970 | Ball | 264/95 |
| 3,546,745 | 12/1970 | Ball | 425/71 |
| 3,745,150 | 7/1973 | Corsover | 264/98 X |
| 3,821,349 | 6/1974 | Mozer | 264/209 |
| 3,849,530 | 11/1974 | Wyeth et al. | 264/98 X |

*Primary Examiner*—Jan H. Silbaugh

[57] ABSTRACT

Polyester tubing is extruded with the downstream end open to the atmosphere and with a communication to the atmosphere, if any, through the die having an effective diameter of no more than 50 percent the inside diameter of the tubing. The resultant tube can be cut into parisons having good clarity, which parisons can be easily sealed off at one end.

10 Claims, 2 Drawing Figures

CONTROLLED AIR IN POLYESTER TUBE EXTRUSION FOR CLEAR SEALABLE PARISON

BACKGROUND OF THE INVENTION

This invention relates to forming clear polyester tubing for use as parisons in blow molding operations.

Saturated thermoplastic polyesters such as polyethylene terephthalate are commercially available resins which have long been of substantial economic importance in many end uses. While such polymers can be quenched and oriented to form clear films, their normal appearance in relatively thick sections is white and opaque. Because of the tendency of this material to be opaque in thick sections, polyesters have not been considered to any great extent for use in the production of bottles from preformed parisons. In addition to the problem with clarity, polyesters tend to be difficult to seal and thus production of bottles from the most convenient source of parisons, work pieces cut from a continuous length of tubing, have presented particular difficulties because of the tendency of the resulting bottles to leak where the end of the parison is sealed to form the bottom of the bottle.

Conventional surface-treating techniques which have been found useful with other polymers to improve adhesive qualities such as ozone treatment, flame treatment, Corona discharge, and the like, are not effective for improving the seal in an oriented bottle made from a preformed polyester parison. In addition, such treatments require an extra step which is undesirable.

SUMMARY OF THE INVENTION

It is an object of this invention to provide a relatively thick wall clear tubing of polyethylene terephthalate; it is yet a further object of this invention to make possible the economic production of clear biaxially oriented polyester bottles; and it is yet a further object of this invention to provide clear tubular parison preforms which can be sealed easily.

In accordance with this invention, thermoplastic polyester is extruded into tubing with the downstream end of the tubing open to the atmosphere and with communication to the atmosphere, if any, through the die mandrel by means of a conduit having an effective internal diameter of no more than 50 percent the internal diameter of the tubing.

BRIEF DESCRIPTION OF THE DRAWINGS

In the drawings, forming a part hereof, wherein like reference characteristics denote like parts in the various views.

DESCRIPTION OF THE PREFERRED EMBODIMENTS

Figure 1:
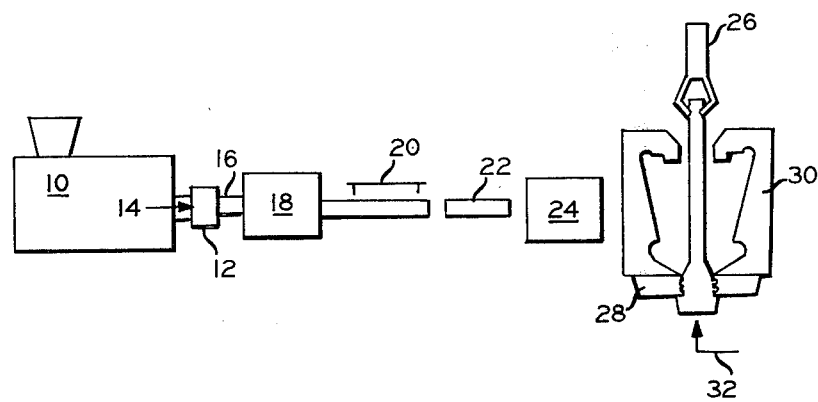
FIG. 1 is a schematic representation of an apparatus for forming tubing in accordance with the invention.

The instant invention is applicable to the formation of tubing of saturated thermoplastic polyesters, particularly polyethylene terephthalate. As used herein the term "saturated thermoplastic polyester" is intended to be used in its conventional sense to depict normally solid polymer which can be heated to a high temperature and remelted over and over as opposed to a thermoset resin. These polymers have no effective amount of olefinic unsaturation but, of course, generally have aromatic unsaturation. An especially suitable polymer is polyethylene terephthalate having an inherent viscosity of 0.4 to 1.2, preferably 0.55 to 0.99 as measured by ASTM D-2857 except using a 60:40 mixture of phenol/tetrachloroethane as solvent.

Copolymers of ethylene terephthalate in which a minor amount, i.e. up to about 10 mole % of the ethylene glycol is substituted with another dihydric alcohol as for example diethylene glycol; 1,3-propane diol; 1,4-butane diols; polytetramethylene glycol; polyethylene glycol; polypropylene glycol; 1,4-hydroxymethylcyclohexane, and the like are also suitable. Acids such as isothalic; bibenzoic; naphthalene-1,4-dicarboxylic; naphthalene-2,6-dicarboxylic; adipic; sebacic; decane-1,10-dicarboxylic acid and the like can be substituted in part, i.e. up to about 10 mole %, for the terephthalic acid. Polyesters can be produced from the respective glycols and acids or by trans esterification, as is well known in the art. Preferably, the copolymers contain at least 90 mole per cent of the polycondensation product of ethylene glycol and terephthalic acid.

The polymer is extruded from the melt into the shape of a tube. It is preferred to carry out this extrusion at a melt temperature within the range of 500° to 580° F. (260° to 304° C), preferably 510° to 570° F. (266° to 299° C.).

While the invention can be utilized in the formation of tubing of any thickness, the problem with tubing being opaque is present to a much lesser extent in tubing having a wall thickness of 75 to 90 mils (1.9 to 2.3 mm) or less. Above these thicknesses, conventional extrusion of the polymer results in a white coloration varying from translucent to completely opaque. Thus, the invention is of particular applicability in the production of tubing having a wall thickness of greater than 90 mils, preferably 90 to 160 (2.3 to 3.8 mm) more preferably 115 to 140 mils (2.9 to 3.6 mm).

It is essential that some ambient air be present, since tubing under a dry inert atmosphere, while giving clear tubing, results in the tubing being difficult or nearly impossible to seal. Excessive ambient air must be avoided, however, or the polymer will have opaque portions.

Surprisingly, clear thick wall tubing which can be sealed is produced if the downstream end of the parison is left open and the conduit supplying air through the die for the startup is either closed off completely or closed off to an effective internal diameter of no more than 50 percent of the internal diameter of the tubing.

This can be effected by utilizing a relatively small diameter conduit as, for instance, a metal pipe having an internal diameter of 1/16 to 3/16 of an inch (1.6–4.8 mm) or by utilizing a valve in the conduit. Obviously, the conduit does not have to be round and the recitation that the conduit has an effective diameter of no more than 50 percent the diameter of the tubing is meant to encompass any means where the carrying capacity of the conduit is equal to a round conduit having a diameter of no more than half that of the internal of the tubing. To some extent this is also affected by the length of the conduit between its communication with the ambient air and the die face. Generally, the distance will be in the neighborhood of 10 to 24 inches (25.4 to 61 cm) or about 13 to 32 times the internal diameter of the tubing being extruded.

It is essential to have communication with the interior of the tubing through the die during the startup period in order to expand the tubing out into contact with the sizing sleeve which will be described in greater detail hereinbelow. After the startup is complete and the downstream end of the tubing is opened to the atmosphere, this conduit can be shut off completely or can be regulated as set out hereinabove so as to have an effective internal diameter of no more than 50 percent of that of the internal diameter of the tubing, preferably an effective internal diameter of no more than 15 percent of the internal diameter of the tubing, most preferably 5 to 12 percent. The downstream end of the tubing after startup is open to ambient air. It is essential that the tubing be formed by expanding same out into conformity with an external sizing sleeve by means of an exterior vacuum. Such a vacuum means is known in the art, as is shown in Ball U.S. Pat. No. 3,546,745, the disclosure of which is hereby incorporated by reference.

There is no internal restriction to air movement within the tube downstream of the die face. By this is meant that no internal cooling mandrel, sizing mandrel, liquid cooling spray, or the like is utilized. Thus, ambient air is in communication with the interior of the tubing. However, there is no significant flow of this air through the tubing. The downstream end of the tubing will generally be a distance of about 3 to 50 (0.9 to 15 m), more generally 6 to 15 feet (1.8 to 4.6 m) downstream of the die face depending upon the extrusion rate and cooling capacity. This distance will vary slightly during the extrusion, since the extrudate is continuously formed and periodically cut into sections. In a preferred embodiment, it is cut into sections to produce the parisons which will generally be about 5 to 7 inches (127 to 178 mm) in length. Stated in terms relative to the inside diameter of the tubing, the downstream end of the tubing will be spaced apart from the die face a distance of about 50 to 800 times the internal diameter of the tubing.

It has been found surprisingly that the relatively thick wall tubing formed in the manner of this invention is both clear and sealable. Parisons from such tubing can be formed into clear biaxially oriented bottles by heating the parisons relatively rapidly to orientation temperature, grasping same at each end, stretching same longitudinally, and expanding same into conformity with a molding zone. This can be done by heating the parisons in an air oven at a temperature of 240° to 370° F. (116° to 188° C.), preferably 250° to 360° F. (121° to 182° C.). The parisons must be subjected to this temperature for a time of 7 minutes or less, preferably 1 to 6 minutes. Particularly desirable results are obtained using heating temperatures of 240° to 290° F. (116° to 143° C.) and times of 2 to 6 minutes. Parisons formed from tubing made in accordance with this invention have good clarity initially, and on rapid reheating and forming as noted hereinabove produce clear high strength articles. If the tubing made in accordance with the invention is reheated slowly, the resulting blow-molded article will have high haze or else the parison cannot be fabricated at all.

The product of this invention has been described in terms of clarity, which is an indication of the amorphous state for the normally crystalline polyester. It is possible, however, to have various additives in the polymer, such as antioxidants, UV stabilizers, antistatic agents and the like, including pigments and dyes.

Referring now to the drawings, particularly FIG. 1, there is shown extruder 10, having a die head 12. Conduit 14 enters the die head 12 along a line coaxially disposed relative to the extrudate and terminates at the die face. Tubular extrudate 16 is drawn down and passed to vacuum sizing and cooling zone 18 and thence to cutter 20 where it is severed into individual open end tubular parisons 22. Parisons 22 are passed to oven 24 where they are reheated to orientation temperature. The parisons are then grasped by means 26 and removed from the oven and placed in position between thread-forming jaws 28 adjacent the neck-forming end of mold halves of 30, which mold halves form a molding zone. Fluid pressure is introduced into the interior of the parison via line 32 to create a fluid pressure differential to expand the parison out into conformity with said molding zone. The portion of the apparatus represented by reference characters 26 through 32 are not to scale relative to the extruder and oven, but rather are shown in enlarged form for the sake of better depicting this part of the apparatus.

Figure 2:
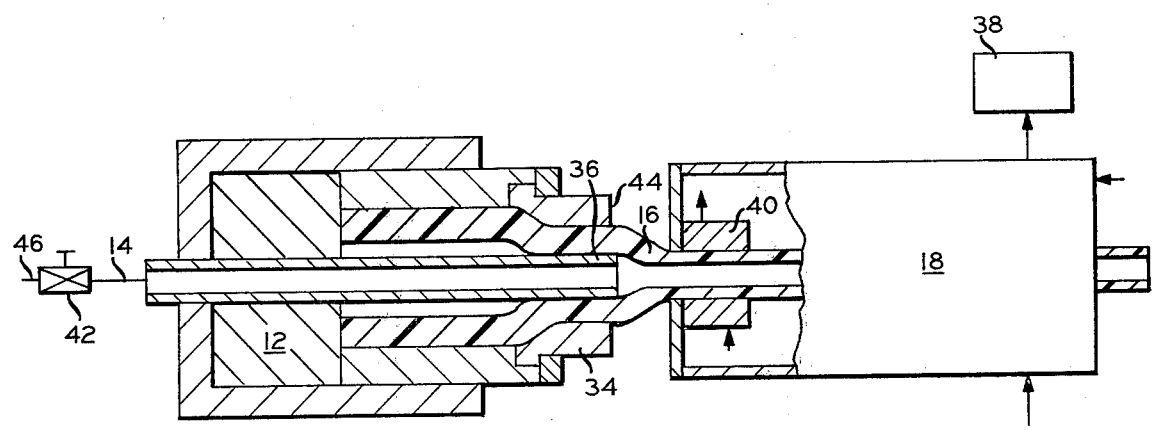
FIG. 2 is a cross-section showing in detail the die and sizing sleeve.

Referring now to FIG. 2, there is shown in greater detail die head 12 and vacuum cooling and sizing means 18. Molten polymer 46 from extruder 10 passes into crosshead die 12 and is formed into a tubular extrudate by means of die bushing 34 and hollow die mandrel 36. The thus formed extrudate 16 passes into vacuum sizing and cooling means 18. Vacuum means 38 creates a reduced pressure within means 18. This vacuum causes extrudate 16 to be brought out into contact with the inner surface of cylindrical sizing sleeve 40 where the tubing is calibrated and cooled to an essentially self-supporting state. The tubing then passes out of sizing sleeve 40 into the downstream portion of vacuum sizing and cooling means 18 wherein it is submersed in a cooling fluid such as water. Conduit 14 has valve means 42. As can be seen, conduit 14 is in communication with the interior of the extrudate downstream of die face 44. As noted hereinabove, conduit 14 terminates at die face 44 and is open to the ambient air via end 46. As noted in the detailed discussion hereinabove, conduit 14 can either be of small diameter compared with the interior diameter of tubing 16 or else valve means 42 can be utilized to restrict the effective diameter of conduit 14 to a value within the range of 0 to 50 percent of that of the tubing. During startup, air under atmospheric pressure is introduced via line 14 and the downstream end of the tubing is closed off. However, after the startup is complete, no further air flow is affirmatively initiated and the parison is maintained in contact with the sizing sleeve 40 by means of the vacuum with the downstream end of the extruded tubing being in open communication with the ambient air.

Many conventional parts have been omitted from the figures for the sake of simplicity, but their inclusion is understood by those skilled in the art and is within the scope of the invention.

EXAMPLE

Control 1

A commercially available polyethylene terephthalate sold under the trademark ARNITE A-200 by American ENKA Corporation was extruded into tubing utilizing an extruder temperature of 498° to 532° F. (254° to 278° C.) from the hopper zone to the front and a die temperature of 550° F (288° C.). The resulting tubing was passed directly into a cooling chamber such as is shown in FIGS. 1 and 2 and having a vacuum sizing sleeve. The conduit corresponding to conduit 14 of the drawings had a length of 14 inches (36 cm) and an effective diameter of approximately 0.7 inch (18 mm), i.e. just slightly less than the internal diameter of the tubing which was approximately 0.75 inch (19 mm). The resulting extrudate had varied clear and cloudy sections and was unsuitable for use in production of bottles.

Control 2

A second run similar to that of control 1 was carried out except that a dry nitrogen blanket was maintained within the interior of the extrudate by passing nitrogen through the conduit communicating between the ambient air and the interior of the parison at the die face. The resulting extrudate was clear, but a satisfactory seal could not be achieved when parisons made therefrom were subjected to blow-molding at orientation temperature.

Run 1

Identical polymer to that of the control runs was fabricated in an identical apparatus except that the diameter of the conduit communicating between the interior of the parison at the die face and the ambient air was 1/16 inch (1.6 mm). The distance between the end of the conduit terminating at the die face and the other end in communication with the ambient air was 14 inches. The vacuum sizing and cooling means was about 6 feet (1.8 m) in length and the cutting mechanism utilized about 6 feet so that the parisons, which ranged from 5 to 7 inches (127 to 178 mm) were severed at a point wherein the open end of the extrudate was approximately 12 feet (3.6 m) from the die face, which was identical to the procedure utilized in controls 1 and 2 above. The resulting tubing was clear even at wall thicknesses up to 140 mils (3.6 mm). The parisons were placed in an air oven and at a temperature of about 300° F. (149° C.) for a time of about 2½ minutes to heat same to orientation temperature, and placed in an apparatus such as shown in FIG. 1. Mold halves were closed on a stretched portion of the parisons to apply pressure from opposed sides and excellent seals were obtained; this technique was exactly the same as used in control run 2.

Run 2

A second run identical to Run 1 was carried out except that the conduit communicating between the interior of the parison at the die face and the ambient air was completely closed off after start up. The resulting tubing was clear and parisons cut therefrom could be sealed and blown into clear bottles utilizing the same conditions as in Control 2 and Run 1. The downstream end of the extruded tubing was open to the atmosphere in all of the control and invention runs.

While this invention has been described in detail for the purpose of illustration, it is not to be construed as limited thereby but is intended to cover all changes and modifications within the spirit and scope thereof.

I claim:

1. A process for producing a clear, easily sealed, saturated thermoplastic polyester tube comprising: heating a saturated thermoplastic polyester to a molten state;
    forcing said molten polyester through an annular die to form a tube;
    passing said thus formed tube to and through an external sizing sleeve maintained under a vacuum and bringing said tube out into conformity with said external sizing sleeve by means of said vacuum;
    maintaining free communication between a downstream end of said tube and ambient air with no internal restriction on air movement within said tube downstream of a face of said die, said tube being periodically severed so that said downstream end thereof is separated from said die face by distance equal to 50 to 800 times the internal diameter thereof; and
    wherein the sole communication with any fluid through said die is with ambient air introduced through a conduit having an effective internal diameter of 0 to 50 percent of the internal diameter of said tube.

2. A method according to claim 1 wherein said conduit has an effective internal diameter of 0 to 15 percent of the internal diameter of said tube.

3. A method according to claim 1 wherein said conduit has an effective internal diameter of 5 to 12 percent of the internal diameter of said tube.

4. A method according to claim 1 wherein said polyester is polyethylene terephthalate.

5. A method according to claim 4 wherein said polyester is melt extruded at a temperature of 500° to 580° F and said effective diameter of said conduit is 0.

6. A method according to claim 4 wherein said tubing has a wall thickness of greater than 90 mils.

7. A method according to claim 1 wherein said tubing is cut into open end parisons, said parisons are reheated to a temperature within the range of 240° to 370° F., stretched longitudinally, sealed at one end by means of pressure applied to opposed sides of said parison, and expanded into conformity with the molding zone by means of internal fluid pressure.

8. A method according to claim 7 wherein said polyester is polyethylene terephthalate.

9. A method according to claim 8 wherein said tubing has a wall thickness within the range of 115 to 140 mils, said parison is reheated in a time of 1–6 minutes, and the resulting article is clear.

10. A method according to claim 9 wherein said effective diameter of said conduit is within the range of 5 to 12 percent of the internal diameter of said tubing.

* * * * *